United States Patent [19]
Guigon et al.

[11] Patent Number: 5,203,244
[45] Date of Patent: Apr. 20, 1993

[54] DEVICE FOR CUTING UP A COMPONENT OF A NUCLEAR REACTOR

[75] Inventors: Jean-Paul Guigon, Hameau de Varanges; Paul Jacquier, Tassin-la-Demi-Lune, both of France

[73] Assignee: Framatome, Courbevoie, France

[21] Appl. No.: 832,054

[22] Filed: Feb. 6, 1992

[30] Foreign Application Priority Data

Feb. 6, 1991 [FR] France ..................... 91 01336

[51] Int. Cl.⁵ .................. E04G 23/08; B26D 1/18; B26D 7/18
[52] U.S. Cl. .................................... 83/153; 83/471.1; 83/930; 29/723; 82/82; 82/83; 299/43; 299/74; 299/76; 299/78
[58] Field of Search .............. 83/153, 471.1, 930; 29/723; 82/82, 83; 299/43, 64, 73, 74, 75, 76, 77, 78

[56] References Cited

U.S. PATENT DOCUMENTS

| | | | |
|---|---|---|---|
| 2,506,076 | 5/1950 | Garrison | 83/471.2 |
| 2,783,789 | 3/1957 | Konway | 299/74 |
| 4,572,303 | 2/1986 | Marechal | 299/75 |
| 4,756,067 | 7/1988 | Howell et al. | 29/723 |
| 4,813,313 | 3/1989 | Ichikawa et al. | 83/178 |

FOREIGN PATENT DOCUMENTS 2554256  6/1977  Fed. Rep. of Germany .

Primary Examiner—William E. Terrell
Attorney, Agent, or Firm—Pollock, Vande Sande & Priddy

[57] ABSTRACT

The device comprises a support (9) provided with means (12) for its demountable fastening to the reactor structure (1) above and vertically in line with the component (3), a turret (10) mounted rotatably on the support (9) about its vertical axis, a device for taking up forces (11), on which the lower end of the turret (10) is mounted rotatably, an arm (18) mounted movably on the turret (10) in a radial direction, a first cutting unit (20) mounted on the movable arm (18), a trolley (25) mounted movably on the turret (10) in the vertical direction, a vertical second cutting unit mounted on the trolley (25) and a means for handling (30) fragments of the component (3).

6 Claims, 3 Drawing Sheets

DEVICE FOR CUTTING UP A COMPONENT OF A NUCLEAR REACTOR

The invention relates to a device for cutting up irradiated component of a nuclear reactor which has a wall of tubular overall shape and is arranged with its axis vertical in a part of the structure of the nuclear reactor. In particular, the invention relates to a device which makes it possible to cut up the wall of a vessel of a water-cooled nuclear reactor.

Water-cooled nuclear reactors comprise a vessel which is intended to contain the core of the nuclear reactor and which is connected to the reactor cooling circuit in which the cooling water circulates.

The wall of the reactor vessel, which is in contact with the cooling fluid and exposed to the radiations emitted by the core of the reactor is activated and contaminated after the reactor has been operating for some time.

In the case of nuclear power stations which have reached the end of their life and which require a complete shutdown, the solution adopted hitherto has been to leave these power stations in the state in which they were and to allow the activity of the constituent materials of their components to decrease in order to dismantle them subsequently under more satisfactory conditions than at the time of the shutdown, without having to employ complex remotely controlled tools.

In the future, the number of power stations which will be taken out of industrial use will increase appreciably, with the result that it is necessary to envisage dismantling these power stations in order to restore the site where they are built to its original state.

Dismantling of the conventional part of the power station does not present any particular problem but, on the other hand, the dismantling of the part of the power station forming the actual nuclear reactor presents problems which are difficult to solve, because of the radioactive emissions of the constituent materials of the components of the reactor.

In particular, the vessel of water-cooled nuclear reactors, which contains the fuel assemblies and which is in contact with the cooling water of the reactor during its operation, is activated and contaminated in the case of reactors which have reached the end of their life.

The vessel of water-cooled nuclear reactors is in the form of a body of tubular overall shape closed by convex ends, of large size and thick-walled.

The vessel, whose mass is very great, is arranged inside a vessel well which is provided in a concrete structure which also defines one or more pools situated above the upper level of the vessel.

A process for dismantling an irradiated component of a nuclear reactor, such as a vessel, by cutting up its wall, was proposed in Patent Application No. 90-08,117, filed on Jun. 27, 1990 by Framatome.

To implement this process, the connecting members between the concrete structure of the reactor and the component to be dismantled are removed, the component is moved a certain distance in the vertical direction, along its axis inside the well and in successive stages and the cutting up of the wall of the component is carried out over a height corresponding substantially to the vertical distance of movement. This gives blocks of irradiated materials of the wall at the upper level of the well in which the component is placed and the cut blocks are removed so that they can be disposed of or stored.

The movement of the component in the vertical direction can be obtained by virtue of a hoisting mast arranged along the axis of the component and connected to its lower part.

Units for cutting the wall of the component, comprising a band saw or a circular saw, can be attached to the hoisting mast or to a support resting on the reactor structure.

Patent Application 90-13,816 filed by Framatome has also proposed a process for dismantling an irradiated component of a nuclear reactor, in which the progressive raising of the component is carried out so as to carry out its cutting up in successive stages, by virtue of lifting means arranged below the component and exerting a thrust on the lower part of this component.

The cutting up of blocks of materials from the wall of the component requires the use of cutting units supported by the reactor structure and arranged in a region such as the upper part of the vessel well into which the upper part of the component to be cut up is introduced.

Whatever the method of moving the component in the vertical direction, the installation and the fastening of the cutting units inside the reactor structure require operations which can be long and difficult to carry out.

Until now there was no known device for cutting up a component of a nuclear reactor, such as a vessel, which was independent and which could be installed in a working position simply and rapidly.

The objective of the invention is therefore to propose a device for cutting up a component of a nuclear reactor which has a wall of tubular overall shape and is arranged with its axis vertical in a part of the structure of the nuclear reactor which is being dismantled, which can be installed in a completely independent manner by simple and rapid operations, whatever the method of moving the component vertically in order to perform its cutting up.

To this end, the device in accordance with the invention comprises:

a support provided with means for its demountable fastening to the reactor structure, above and vertically in line with the component, a turret arranged vertically, resting on the support by means of its upper part and mounted rotatably on the support around its vertical axis, a device for taking up forces, on which the lower end of the turret is mounted rotatably, an arm mounted movably on the turret in a radial direction, a first cutting unit comprising a circular saw arranged horizontally and mounted on the movable arm, a trolley mounted movably on the turret in the vertical direction, a second cutting unit comprising a circular saw arranged vertically and mounted on the trolley, and a means for handling fragments of the component which are obtained by cutting up the wall, comprising a hoist fastened to the turret and having a lifting cable at the end of which is suspended a means for grasping fragments of the component.

To make the invention properly understood, a description will now be given, by way of example without any limitation being implied, with reference to the figures enclosed as an appendix, of a device in accordance with the invention, employed for cutting up a vessel of a water-cooled nuclear reactor.

Figure 1:
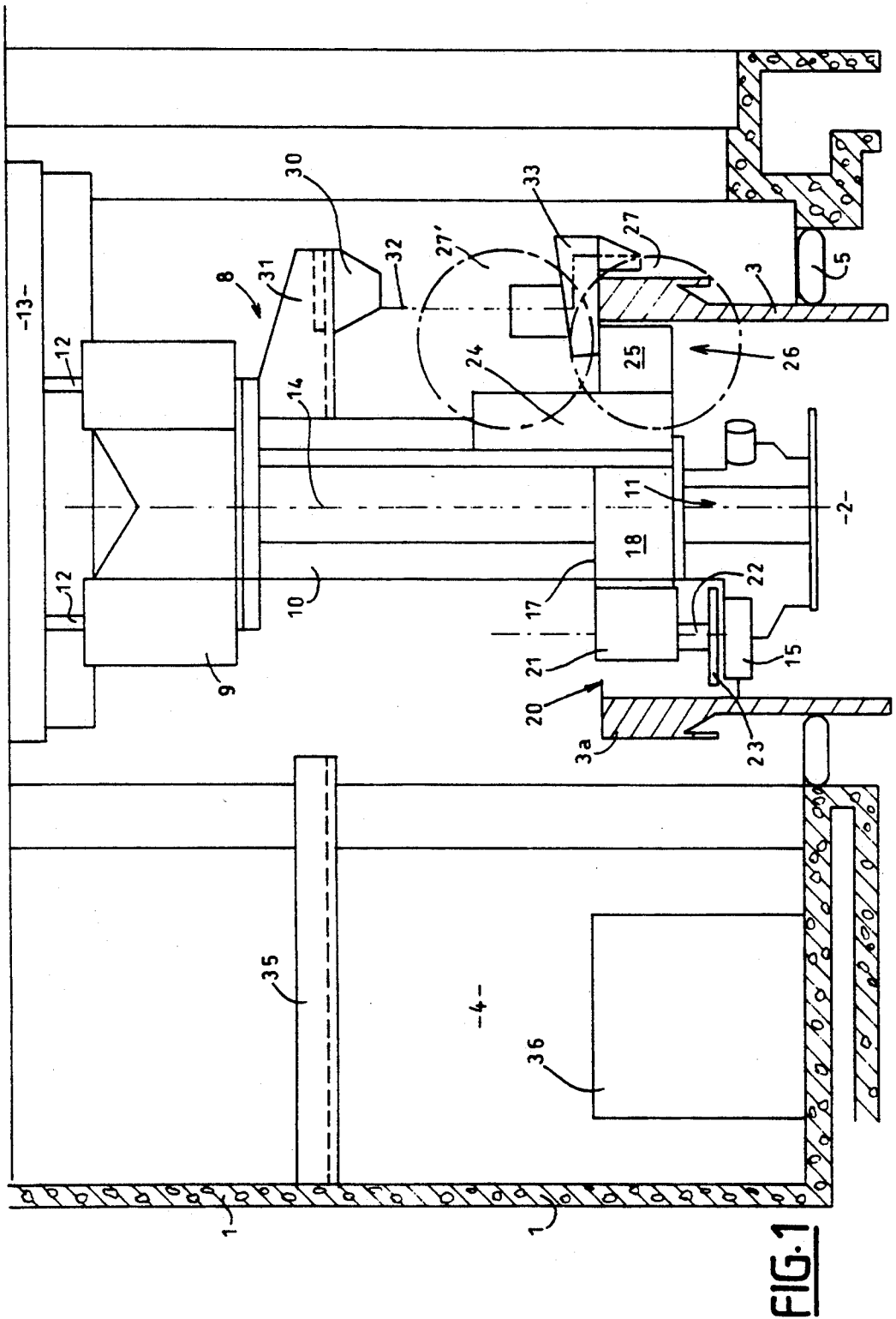
FIG. 1 is a partially sectioned elevation view of a device in accordance with the invention, in working position in the structure of a nuclear reactor, for cutting up the reactor vessel.

FIG. 1 shows the concrete structure 1 of a nuclear reactor defining a vessel well 2 inside which is arranged the reactor vessel 3.

The vessel 3 comprises a tubular wall whose upper part 3a, of great thickness, is intended to receive the closure cover of the vessel.

Figure 3:
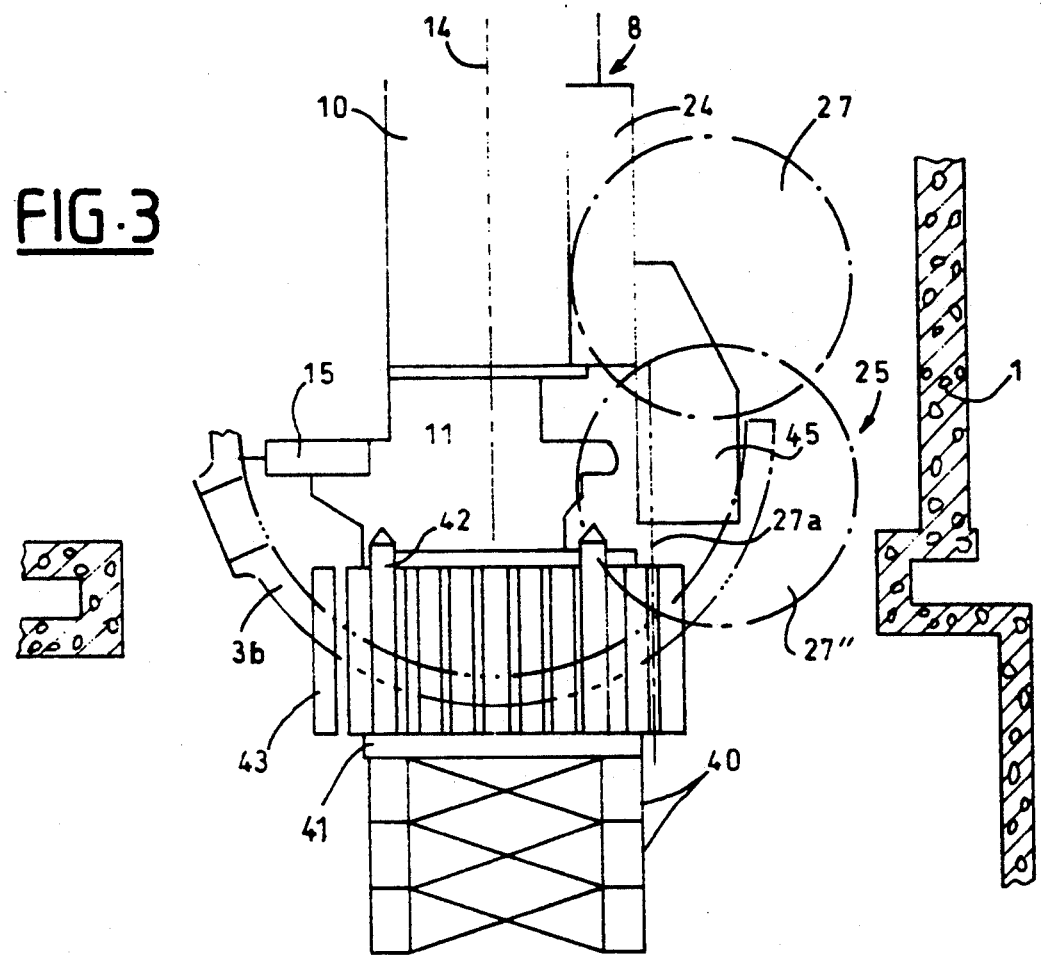
FIG. 3 is a partially sectioned elevation view of the lower part of the device, when the bottom of the vessel is being cut up.

The lower part of the vessel 3, not shown in FIG. 1, consists of a bottom 3b of hemispherical shape, which can be seen in FIG. 3.

The dismantling of the nuclear reactor which comprises in particular the operations of cutting up the vessel 3 and of removing the fragments obtained by cutting up is carried out, after the definitive shutdown and cooling of the reactor, inside the structure 1, the core assemblies and the internal structures of the reactor having been previously taken out of the vessel 3.

The cutting up is carried out in a region situated above the vessel well 2, level with the pool 4 of the reactor.

While the vessel 3 is being cut up, the vessel well 2 is isolated from the pool 4, around the vessel 3, by a leakproof closure 5.

The vessel 3 is moved in successive stages in the vertical direction, so that its upper part on which the cutting up is carried out is arranged above the bottom of the pool 4.

The cutting device in accordance with the invention, denoted generally by reference 8, comprises a rigid support 9, a turret 10 suspended, by means of its upper part, from the support 9 and a device for taking up forces 11 in which the lower part of the turret 10 is engaged.

The rigid support 9 comprises removable means 12 for fastening to the reactor structure 1, above and vertically in line with the vessel well 2, for example at the biological protection slab 13 of the reactor.

The turret 10, of elongate shape and arranged vertically, is mounted movably in rotation around its vertical axis 14 on the support 9.

When the device 8 is in its working position, as shown in FIG. 1, the axis 14 of the turret 10 is placed along the vertical axis of symmetry of the vessel well 2 and of the vessel 3.

Figure 2:
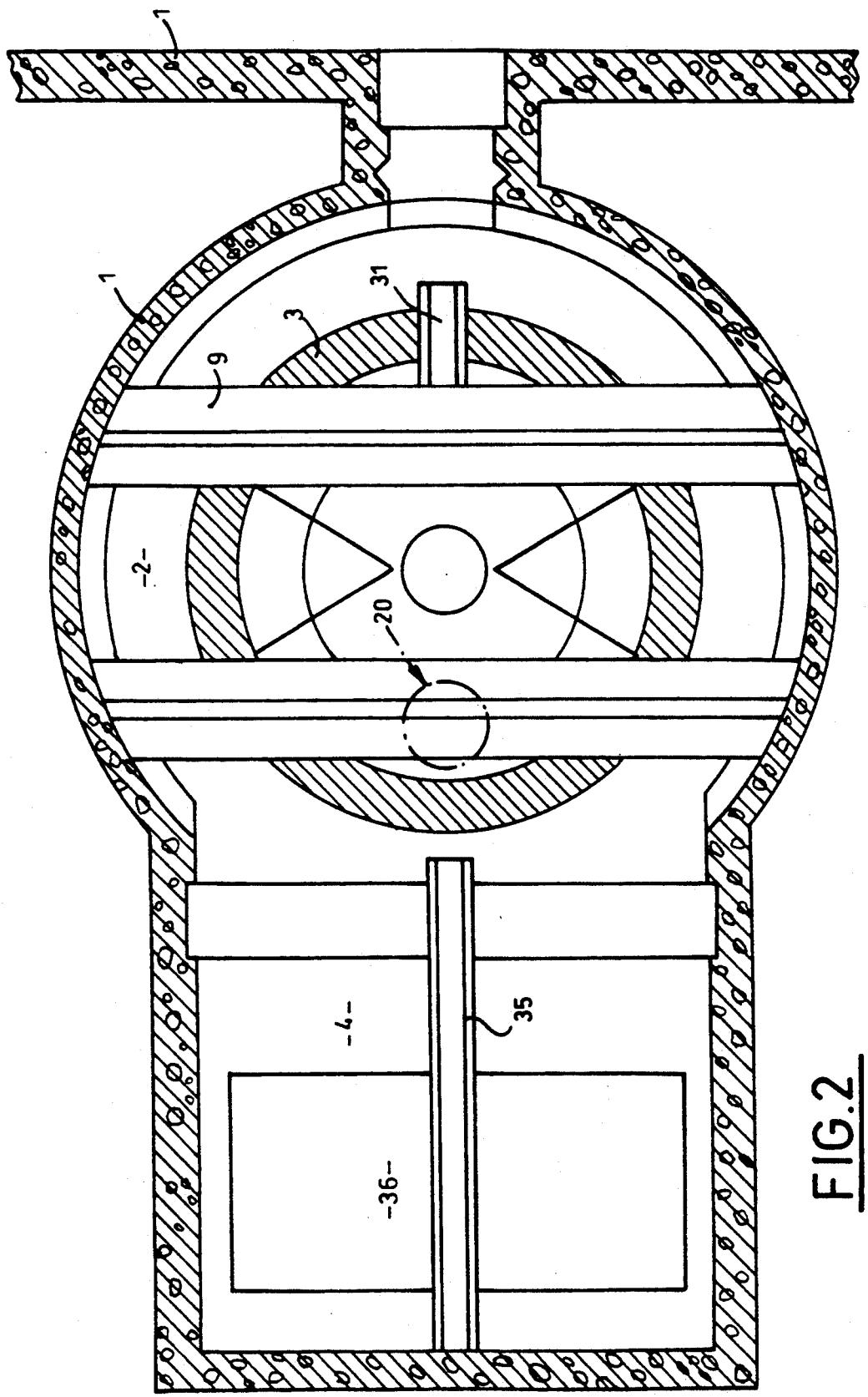
FIG. 2 is a top view of the device shown in FIG. 1.

The arrangement of the support 9 vertically in line with the vessel 3 is shown in FIG. 2.

The lower part of the column 10 engaged in the device for taking up forces 11 is mounted rotatably about its axis 14, in relation to the device 11, to which stiffening jacks such as the jack 15 are attached in a radial direction in relation to the axis 14.

Three jacks 15, arranged at 120° to each other around the axis 14 are capable of bearing via the end of their extendable legs, on the inner surface of the vessel 3. Centring and holding in position of the lower part of the turret 10 is thus obtained, ensuring the stiffening of the cutting device 8, whose lower part is engaged in the upper part of the vessel 3 in the cutting position.

At its lower end, the turret 10 carries a horizontal slide block 17 in a radial direction, that is to say perpendicular to the axis 14 of the turret, by means of which an arm 18 which is movable in the radial direction is mounted on the turret 10.

A cutting unit 20 is fastened to the end of the movable arm 18. The cutting unit 20 comprises a driving motor 21 whose rotary output shaft 22 carries a circular saw blade 23 of flat shape and arranged horizontally.

In its lower part the turret 10 also comprises a vertical slide block 24 on which the trolley 25 of a vertical cutting unit is mounted slidably in the vertical direction.

The cutting unit 26 comprises a drive motor whose rotary output shaft carries a circular saw blade 27 of flat shape and arranged vertically.

It should be noted that the first cutting unit 20 and the vertical second cutting unit 26 are identical and are therefore interchangeable.

In FIG. 1 the vertical circular saw blade 27 has been shown in two extreme positions 27 and 27', corresponding respectively to the low position and to the high position of the trolley 25 of the cutting unit which is mounted movably on the slide block 24.

Driving means, not shown, are associated with the turret 10, the movable arm 18 and the trolley 25 of the vertical cutting unit 26, to enable them to move in rotation around the axis 14, in translation in the radial direction and in translation in the vertical direction, respectively.

The cutting device 8 also comprises a lifting hoist 30 associated with a monorail 31 attached integrally to the turret 10 in its upper part and placed in a radial arrangement in relation to the turret 10.

The hoist 30 associated with the monorail 31, arranged vertically in line and above the wall of the vessel 3, comprises a lifting cable 32 at the end of which is fastened a grasping grab 33 comprising jaws capable of clasping the upper part of the wall of the vessel 3 as a fragment of this wall which has previously been cut up by employing the cutting units.

When the turret 10 is rotated through 180° about its axis, the monorail 31 can be positioned in the extension of a removal monorail 35 and can be coupled to this monorail 35, which is arranged inside the reactor pool 4, in a radial direction in relation to the vessel well 2, so as to ensure the transfer of the fragments of the vessel 3, which have been produced by cutting up its wall, into a container situated in a storage region 36 inside the reactor pool 4.

The cutting up of the vessel 3 by employing the device 8 in accordance with the invention is carried out as will be described below.

The vessel 3 is placed in a vertical position such that its upper part, which is at a level which is higher than the level of the bottom of the pool, surrounds the lower part of the cutting device 8 comprising the device for taking up forces 11 and the cutting units.

The device for taking up forces 11 is clamped inside the vessel 3 by the legs of the jacks 15 bearing against the inner surface of the vessel 3.

The turret 10 of the device 8 is then fastened rigidly to the inside of the vessel 3, in a coaxial arrangement in relation to the wall of the vessel.

The movement of the arm 18 in the radial direction and the rotation of the shaft 22 of the cutting unit 20 are then performed, so as to carry out the cutting up of the wall of the vessel 3, over its entire thickness, along a horizontal cutting line.

The range of movement of the arm 18 and of the cutting unit 20 makes it possible to perform a forward movement of the circular saw blade 23 so as to cut the wall of the vessel over its entire thickness.

The turret 10 is set in rotation about its axis 14 so as to make a horizontal cut in the wall of the vessel over a certain angular range.

The cutting unit 20 is then withdrawn by moving the arm 18 in the direction of the axis 14 of the turret.

The turret 10 is set in rotation around its axis 14 so as to place the vertical cutting unit 26, whose circular saw blade 27 is in its high position 27', in a desired position above the upper edge of the vessel 3, in the region where the horizontal cut has been made previously.

The circular saw blade 27 of the cutting unit is set in rotation and the trolley 25 of the cutting unit guided by the slide block 24 is moved in the vertical direction and downwards, so that the circular saw blade moves between its high position 27' and its low position 27.

When the circular saw blade has reached its low position 27, the ring section of the wall of the vessel 3 produced by horizontal cutting is cut up over its entire height in the vertical direction.

The vertical circular saw blade is then placed back in its high position 27' and the turret 10 is set in rotation to perform an angular movement of determined range, so as to place the vertical circular saw blade in a new position for cutting the ring section of the wall of the vessel 3.

By setting the vertical circular saw blade 27 in rotation and by moving the trolley 25 of the cutting unit in the vertical direction and downwards a new cut in the ring section can then be made, throughout its height, so as to detach a fragment of the wall of the vessel 3, defined by one horizontal cut and two vertical cuts.

Before the second vertical cut is made in the wall of the vessel, the grasping grab 33 of the lifting hoist 30, whose position along the periphery of the turret 10 adjoins the position of the vertical cutting unit 25, is clamped onto the wall, onto the fragment which is being cut off.

When the second vertical cut has been made, the fragment is completely detached from the wall of the vessel, with the result that it can be lifted above the upper part of the vessel by employing the hoist 30.

The circular saw blade of the vertical cutting unit is placed back in its high position 27'.

During the cutting operations the swarf produced is thrown inside the vessel.

The monorail 31 of the hoist 30 is placed in the extension of the monorail 35 by rotating the turret 10.

The fragment of the wall of the vessel 3 which has been cut up is picked up by the grab 33 suspended from the trolley of the monorail 31, is transferred to the monorail 35 and is then deposited inside a container in the storage region 36.

The cutting up and the removal of a new fragment of the vessel, in the region in which the horizontal cut has been made, can then be performed as described above.

After having performed the cutting up and the removal, in fragments, of the whole of the ring section produced by a horizontal cut, a new horizontal cut is made by employing the cutting unit 20. The new ring section of the wall of the vessel 3 is cut again and removed as described above.

The cutting up and the removal, in fragments, of a complete ring corresponding to a section of the vessel 3 can thus be performed.

The first section of the vessel whose cutting up and removal is carried out consists of its widened upper part 3a.

At the end of each of the operations of cutting up and removing a section of the vessel, the legs of the jacks 15 of the device for taking up forces 11 are placed in their retracted position, so as to make it possible to move the vessel 3 vertically upwards over a length corresponding substantially to the height of the section cut up previously.

A new operation of cutting up and removing a ring-shaped section of the vessel can then be carried out.

The lifting of the vessel 3 in successive stages will be preferably carried out by employing a process and a device such as described in Patent Application 90-13,816 filed by Framatome.

As shown in FIG. 3, the lifting device employed comprises modular supporting units 40 which are intended to be stacked on each other and inserted between the bottom of the vessel 3b and a supporting surface of the reactor structure.

The height of a modular unit 40 corresponds to the height of lifting of the vessel 3 between two successive operations of cutting up an annular section.

The vessel bottom 3b rests on the modular unit 40 situated at the top of the stack, by means of a support plate 41 fastened under the bottom of the vessel 3b, by means of shafts 42 engaged in tubes 43 passing through the vessel bottom 3b.

Depending on the type of reactor vessel which is being cut up, the tubes 43 passing through the vessel bottom 3b may consist of instrumentation guide tubes or of guide tubes for reactor control rods.

FIG. 3 shows the lower part of the cutting device 8 in accordance with the invention, in the final stage of cutting up, consisting in cutting up the vessel bottom 3b.

In this final stage, the bearing of the legs of the jacks 15 of the device for taking up forces 11, against the inner wall of the vessel at the hemispherical bottom 3b, no longer makes it possible to ensure an efficient connection between the cutting device 8 and the remaining part of the wall of the vessel.

The shafts 42 which are integrally attached to the plate 41 for supporting and raising the vessel are then connected to the device for taking up forces 11 by their upper part, so as to ensure an efficient mechanical connection between the lower part of the cutting device 8 and the vessel bottom 3b to be cut up.

The vertical cutting unit and the means for guiding this cutting unit vertically can be adapted so as to make it possible to perform the cutting up of the vessel bottom.

The slide block 24 is extended downwards by an extender adaptor 45 permitting a downward movement of the circular cutting blade beyond its low position 27 and as far as a position 27'' shown in FIG. 3.

In addition, the circular cutting blade 27 can be placed in a vertical position 27a in which the plane of the blade is perpendicular to the vertical plane of movement of the blade 27 between its successive positions 27, 27' and 27''. Furthermore, the axis of the blade 27 in its position 27a has a radial direction and is therefore convergent with the axis 14 of the turret 10. The distance between the axis 14 of the turret and the plane of the blade 27 in its position 27a is substantially shorter than the radius of the hemispherical bottom 3b.

Figure 4:
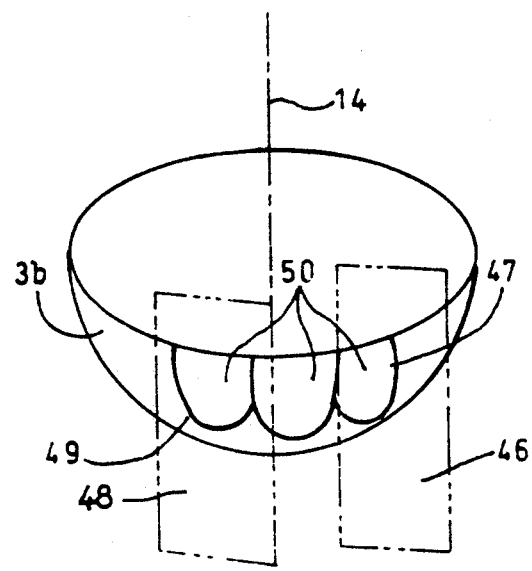
FIG. 4 is a perspective view showing the bottom of the vessel being cut up by employing the device in accordance with the invention.

As can be seen in FIG. 4, the cutting up of the hemispherical bottom 3b of the vessel 3 is performed by making vertical cuts in radial planes, such as the plane 46, by moving the circular cutting blade between its positions 27 and 27" shown in FIG. 3, the vertical cutting unit being guided by the slide blocks 24 and 45 when it moves vertically and downwards Different successive cuts 47 are made in radial planes such as 46 by rotating the turret 10 through a certain angle around its axis 14 between two cutting operations employing the blade 27 moving between its positions 27 and 27".

The blade 27 is then placed in its position 27a so as to make a cut in the vessel bottom 3b in a plane such as 48, perpendicular to a radial plane and parallel to the axis 14 of the vessel.

The blade 27 is placed successively, by orienting the turret 10, in positions which permit the cutting up of the sections of the vessel bottom included between two vertical and radial cuts 47. Cuts 49 are thus made on the vessel bottom, each situated in a plane 48 and permitting a petal-shaped fragment 50 of the vessel bottom to be detached. Each of the fragments 50 is removed by employing the hoist 30 and the monorail 35.

The cutting up and the removal of successive fragments of the bottom of the vessel are thus carried out.

The remaining part of the bottom of the vessel consists of an element in the shape of a spherical cap defined by a crenellated cutting line, this remaining part being removed as a unit.

The cutting up of the whole of the reactor vessel which is being dismantled has thus been carried out by employing a single cutting device whose installation inside the structure of the nuclear reactor is carried out once and for all at the beginning of the cutting-up operation.

The invention is not limited to the embodiment which has been described.

Thus, it is possible to employ a cutting device comprising a support of any shape allowing it to be fastened to a part of the structure of the nuclear reactor other than the biological protection slab.

The turret of the device and the means for guiding the cutting units may be different from those which have been described.

The device for taking up forces and the hoist for handling the fragments of the vessel may be produced in forms which differ from those which have been described.

Finally, the cutting device in accordance with the invention may be employed for performing the dismantling of any component of a nuclear reactor which is of a tubular overall shape and which is arranged with its axis vertical in a part of the structure of the nuclear reactor.

We claim:

1. Device for cutting up a component (3) of a nuclear reactor which has a wall of tubular overall shape and is arranged with its axis vertical in a part of the structure (1) of the nuclear reactor which is being dismantled, characterised in that it comprises:
    a support (9) provided with means (12) for its demountable fastening to the reactor structure (1) above and vertically in line with the component (3),
    a turret (10) arranged vertically, resting on the support (9) by means of its upper part and mounted rotatably on the support (9) about its vertical axis (14),
    a device for taking up forces (11), on which the lower end of the turret (10) is mounted rotatably,
    an arm (18) mounted movably on the turret (10) in a radial direction,
    a first cutting unit (20) comprising a circular saw arranged horizontally and mounted on the movable arm (18),
    a trolley (25) mounted movably on the turret in the vertical direction,
    a second cutting unit (26) comprising a circular saw (27) arranged vertically and mounted on the trolley (25) and a means for handling (30) fragments of the component (3) which are obtained by cutting up the wall, comprising a hoist (30) fastened to the turret (10) and having a lifting cable (32) at the end of which is suspended a means for grasping (33) fragments of the component (3).

2. Device according to claim 1, characterised in that the support (9) is fastened to the structure (1) of the reactor at the location of the biological protection slab (13) of the reactor.

3. Device according to claim 1, characterised in that the first cutting unit (20) and the second cutting unit (26) are identical and interchangeable.

4. Device according to claim 1, characterised in that the device for taking up forces (11) comprises stiffening jacks (15) arranged in the radial direction and whose legs are intended to against the inner surface of the component (3) to ensure the stiffening of the cutting device (8).

5. Device according to claim 1, characterised in that the device for taking up forces (11) comprises means for connecting (41-42) to the lower part (3b) of the component (3), consisting of a convex bottom, so as to carry out the cutting up of the convex bottom (3b) of the component (3) after the cylindrical tubular wall of this component has been cut up.

6. Device according to claim 1, characterised in that the vertically arranged circular saw (27) of the second cutting unit (26) is mounted on this cutting unit so as to be capable of being placed either in a first position where the flat circular saw (27) is in a radial plane passing through the axis (14) of the turret (10), or in a second position where the flat circular saw is perpendicular to a radial plane and parallel to the axis (14) of the turret (10) so as to cut up portions (50) of the bottom (3b).

* * * * *

UNITED STATES PATENT AND TRADEMARK OFFICE
CERTIFICATE OF CORRECTION

PATENT NO. : 5,203,244
DATED : April 20, 1993
INVENTOR(S) : Jean-Paul Guigon et al It is certified that error appears in the above-identified patent and that said Letters Patent is hereby corrected as shown below:

Column 8, claim 4, line 38, after "to" insert --bear--

Signed and Sealed this

First Day of March, 1994

*Attest:*

BRUCE LEHMAN

*Attesting Officer*  *Commissioner of Patents and Trademarks*